United States Patent [19]

Brown

[11] Patent Number: 4,486,743

[45] Date of Patent: Dec. 4, 1984

[54] CREOSOTE BUILDUP DETECTOR AND ANNUNCIATOR

[75] Inventor: Peter K. Brown, Minneapolis, Minn.

[73] Assignee: Honeywell Inc., Minneapolis, Minn.

[21] Appl. No.: 354,983

[22] Filed: Mar. 5, 1982

[51] Int. Cl.[3] ..................... G08B 21/00; G01K 13/00; G01N 25/00

[52] U.S. Cl. ...................................... 340/584; 374/45; 110/193; 340/540; 340/596

[58] Field of Search ............... 340/584, 595, 596, 598, 340/599, 622, 540; 374/45; 73/295; 110/193

[56] References Cited

U.S. PATENT DOCUMENTS

| | | | |
|---|---|---|---|
| 2,172,229 | 9/1939 | Waldo | 374/45 X |
| 2,185,944 | 1/1940 | Holmes | 337/415 |
| 2,640,447 | 6/1953 | Blum | 110/256 X |
| 2,807,013 | 9/1957 | Prough et al. | 340/608 |
| 2,867,703 | 1/1959 | Koslow | 200/61.03 X |
| 3,118,136 | 1/1964 | Steele | 73/295 X |
| 3,181,557 | 5/1965 | Lannan, Jr. | 73/295 X |
| 3,196,679 | 7/1965 | Howland | 73/295 X |
| 3,465,315 | 9/1969 | Alexander et al. | 73/295 X |
| 3,537,803 | 11/1970 | Ignazio | 431/22 |
| 3,846,776 | 11/1974 | Kahn | 73/295 X |
| 3,983,751 | 10/1976 | Cipriano | 73/295 |
| 4,016,758 | 4/1977 | Taylor | 73/295 X |
| 4,279,629 | 7/1981 | Simms | 110/148 X |
| 4,282,521 | 8/1981 | Lieberman | 340/634 X |
| 4,378,555 | 3/1983 | Johnson et al. | 110/193 X |

FOREIGN PATENT DOCUMENTS

| | | | |
|---|---|---|---|
| 772046 | 4/1957 | United Kingdom | 73/295 |

*Primary Examiner*—S. Clement Swisher
*Assistant Examiner*—Tom Noland
*Attorney, Agent, or Firm*—Alfred N. Feldman

[57] ABSTRACT

A creosote buildup detector utilizes a change in temperature between two sensors. The temperature between the two sensors changes as the creosote builds up. This change in temperature is established by providing an electric heater to heat one of the sensor supports. A temperature comparator senses the change in relative temperatures between the two sensors and annunciates when a sufficient creosote buildup has occurred to indicate that cleaning the chimney is necessary.

11 Claims, 1 Drawing Figure

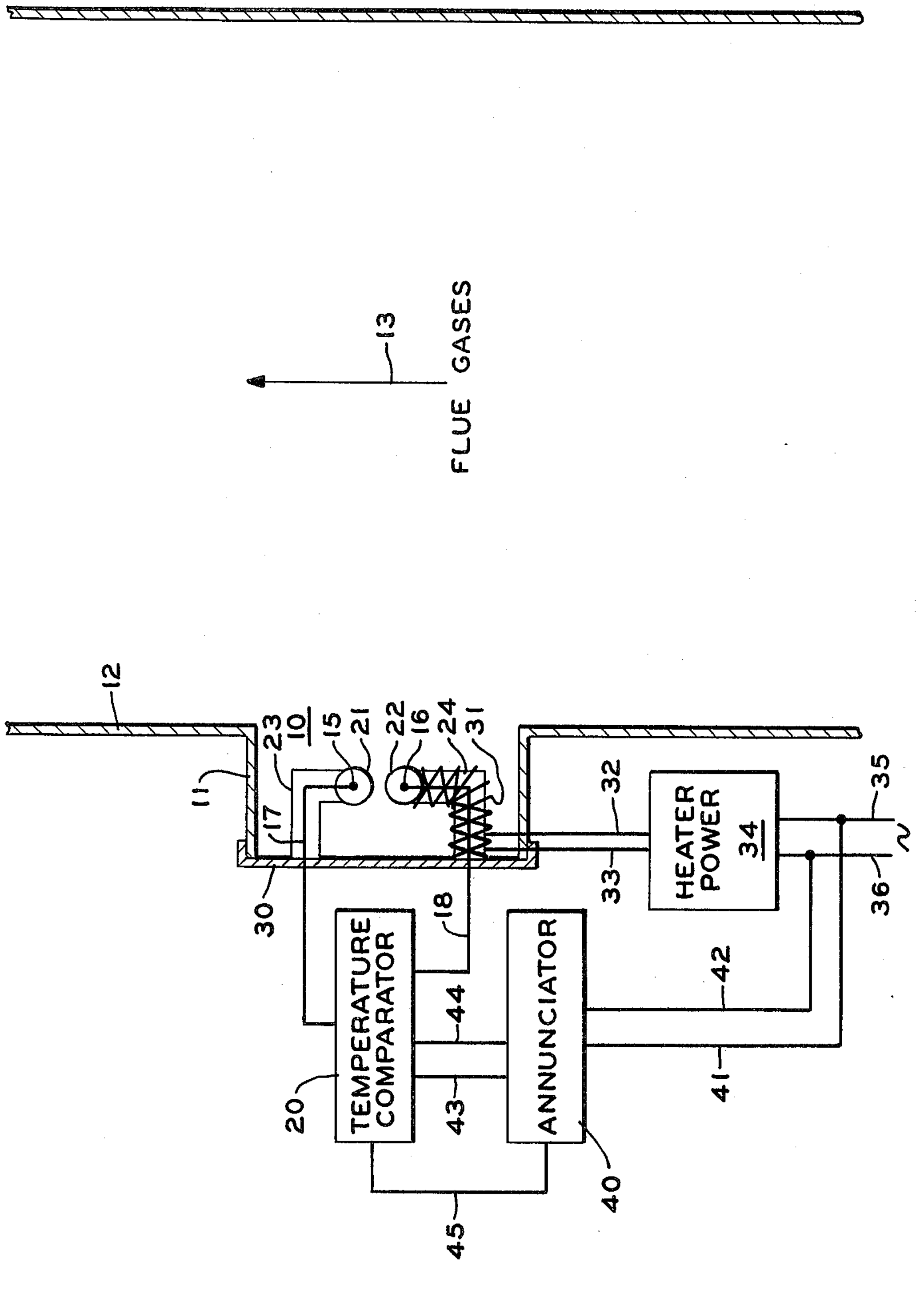
FLUE GASES
13
12
11
23
10
15
21
22
16
24
31
17
30
32
33
HEATER POWER 34
35
36
18
TEMPERATURE COMPARATOR
ANNUNCIATOR
20
44
43
42
41
40
45

CREOSOTE BUILDUP DETECTOR AND ANNUNCIATOR

BACKGROUND OF THE INVENTION

Since the advent of the rapid rise of the price of natural gas and fuel oil, a growing interest has developed in the use of wood as a fuel. The use of wood burning stoves and heaters has rapidly increased, and as a direct result thereof there has been a rapid increase in chimney fires and related problems. The burning of wood, as opposed to natural gas or fuel oil, generates a substantial residue that includes cresote. Typically wood burning devices have chimneys or flues that require regular maintenance, inspection, and cleaning to remove the soot and creosote. If this is not done, the chimney tends to become clogged and the cresote buildup also can catch fire.

The problem in the use of wood burning stoves has been long known, and it has been recommended that periodic inspection and maintenance of the flues or chimneys be undertaken in order to ensure safe operation of wood burning equipment. Many users of this type of equipment become lax or are unaware of the maintenance problems, and as a result thereof the use of wood burning equipment has created a substantial safety problem. In order to avoid this problem, devices have been suggested which monitor the rate of airflow through a chimney as an indication of the creosote buildup. This type of device has many drawbacks including the fact that the change of airflow can be a function of temperature, and the availability of burner air supplied to the inlet of the wood burning apparatus.

SUMMARY OF THE INVENTION

The invention disclosed in the present application is directed to a cresote buildup detector that can be wired electrically to an annunciator to indicate when the walls of a chimney are becoming coated with cresote. This is accomplished by comparing two temperature sensors in proximity to one another, and providing an electric heater to raise the temperature of one of the two sensors. This creates a temperature differential between the two sensors that can be detected. As cresote builds up on this structure, the rate of heat transfer between the two temperature sensors is altered and the change in temperature characteristics can be sensed by an electronic comparator. The comparator then can trigger an annunciator when a creosote buildup has altered the temperature transfer characteristics to a predetermined level.

BRIEF DESCRIPTION OF THE DRAWING

The single FIGURE of the drawing discloses a chimney with a creosote buildup detector and annunciator mounted in a recess in the chimney.

DESCRIPTION OF THE PREFERRED EMBODIMENT

A creosote buildup detector is generally disclosed at 10 and is mounted in a recess 11 of a chimney disclosed at 12. The term "creosote" is used herein to include all products of combustion which collect on the walls of a chimney. The chimney 12 might well be a prefabricated section of the chimney that is placed near the top of the stack, where flue gases are the coolest and the greatest creosote disposition occurs. Whether the chimney section 12 is prefabricated, or where it is located, is not directly material to the present invention. The direction of flow of the flue gases which include the creosote products is indicated at 13.

The creosote buildup detector 10 includes a pair of temperature sensors 15 and 16. The temperature sensors could be thermistors, and these sensors are connected by conductors 17 and 18 to a temperature comparator generally disclosed at 20. The temperature sensors 15 and 16 are enclosed in pods or spheres 21 and 22 with the pods in turn mounted on a pair of insulating supports 23 and 24. The insulating supports 23 and 24 typically would be insulating types of standoffs manufactured from good insulating materials such as a ceramic. The pods 21 and 22 typically would be spheres made of a good conducting material such as brass, aluminum, or a similar metal. The insulating members or standoffs 23 and 24 are rigidly attached to an end portion 30 of the recess 11. The end portion 30 is made removable so that it can be removed from the chimney thereby allowing the removal of the creosote buildup detector 10 for cleaning and maintenance purposes.

The creosote buildup detector 10 is completed by providing an electric heater 31 which encircles the support 24. The heater 31 is connected by a pair of conductors 32 and 33 to a source of electric power 34. Typically this would be a low voltage source developed by step-down transformer from a pair of conventional conductors 35 and 36 that are connected to a conventional source of alternating current. The electric heater 31 could be replaced by a self-heating sensor 16 thereby making the heater and sensor a single sensor means. The source of alternating current potential provided by conductors 35 and 36 is further connected to an annunciator 40 by a pair of conductors 41 and 42. The annunciator 40 provides power by a pair of conductors 43 and 44 to the temperature comparator 20. The temperature comparator provides a signal on an output conductor or cable 45 when the comparator activates the annunciator 40.

OPERATION

The power source 34 is energized providing current via conductors 32 and 33 to the heater 31 which is wrapped around the support member 24 for the temperature sensor 16. This temperature sensor then sees a temperature that is higher than the ambient temperature of the flue gas 13 passing up through the stack or chimney 12. The temperature sensor 15 is unheated and would see a temperature that is close to that of the flue gas.

When the pods 21 and 22 are clean, there will be a heat transfer between the pods by radiation and conduction through the air gap. The temperature difference between the sensors 15 and 16 will have a first value under these conditions. When creosote builds up and forms a coating on the spheres 21 and 22 the air gap is reduced. The air gap could even be reduced to the point where the probes or spheres are bridged by the creosote buildup. The rate of transfer of heat from the heater 31 and the sphere 22, and in turn to the sphere 21 will be altered and the temperature difference between the sensors 15 and 16 will change. When the temperature comparator senses a change to a set threshold value which indicates a large creosote buildup, the annunciator 40 is activated. The annunciator 40 could be a horn, light, or some other type of signal indicating to the home owner that the chimney 12 was sufficiently coated with creosote to justify or require cleaning.

The creosote buildup detector and annunciator 10 is mounted in the recess 11 away from the chimney surface so that it will not be damaged by the sweeping of the flue in a normal cleaning process. The recess 10 has been provided with an access door 30 so that the device can be cleaned and inspected when necessary. To the extent possible, the sensors 15 and 16 should be linear in response to allow the comparator circuit 20 to operate over a wide range of flue temperatures. The structure of the creosote buildup detector 10 is such that the temperature change caused by the building of creosote or a solid bridge of creosote will make the present device operable. Further, the heater 31 should be designed so that its insulating cover does not get hot enough to burn away any of the creosote previously deposited on the probe or sphere 22.

The present invention has been disclosed in a highly simplified form with a number of possible variations in its structure. For this reason, the applicant wishes to be limited in the scope of his invention solely by the scope of the appended claims.

The embodiments of the invention in which an exclusive property or right is claimed are defined as follows:

1. A creosote buildup detector adapted to be mounted in a chimney to detect an unsafe buildup of creosote in said chimney and to annunciate that condition, including: temperature sensing means including first temperature sensor and heat generating means, and a second temperature sensor spaced apart from said first temperature sensor and heat generating means; mounting means including a pair of insulating mounting members with one each of said mounting members to mount said temperature sensor and heat generating means, and said second temperature sensor adjacent each other in said chimney; said heat generating means raising the temperature of said temperature sensors and heat generating means; temperature comparator means connected to said two temperature sensors to compare a relative temperature difference between said sensors caused by said heat generating means; and annunciator means connected to said comparator means to respond to an excess of a set level of temperature difference detected between said temperature sensors to indicate the unsafe buildup of creosote at said pair temperature sensors.

2. A creosote buildup detector as described in claim 1 wherein said first temperature sensor and heat generating means includes a separate first temperature sensor and a seperate heat generating means.

3. A creosote buildup detector as described in claim 2 wherein each of said temperature sensors includes a temperature sensitive element mounted within a heat conducting pod.

4. A creosote buildup detector as described in claim 3 wherein each of said mounting members is a tubular insulating support with said heat conducting pod mounted upon an end of said support; and said tubular support enclosing and protecting circuit means connecting said temperature sensitive element to said temperature comparator means.

5. A creosote buildup detector as described in claim 4 wherein said heater means mounts upon said first of said mounting members and is insulated from said creosote buildup; and said heater means being of insufficient power to burn off said creosote buildup as it occurs.

6. A creosote buildup detector as described in claim 5 wherein said heat conducting pods are metallic spheres.

7. A creosote buildup detector as described in claim 2 wherein said creosote buildup detector is mounted upon a panel that can be readily removed from said chimney for cleaning and inspection.

8. A creosote buildup detector as described in claim 2 wherein said creosote building detector is mounted in a recess in said chimney to protect said creosote buildup detector upon said chimney being cleaned.

9. A creosote buildup detector as described in claim 8 wherein each of said temperature sensors includes a temperature sensitive element mounted within a heat conducting pod.

10. A creosote buildup detector as described in claim 9 wherein each of said mounting members is a tubular insulating support with said heat conducting pod mounted upon an end of said support; and said tubular support enclosing and protecting circuit means connecting said temperature sensitive elements to said temperature comparator means.

11. A creosote buildup detector as described in claim 10 wherein said heater means mounts upon said first of said insulating members and is insulated from said creosote buildup; and said heater means being of insufficient power to burn off said creosote buildup as it occurs.

* * * * *